US009533474B2

(12) United States Patent
Menalda et al.

(10) Patent No.: US 9,533,474 B2
(45) Date of Patent: Jan. 3, 2017

(54) LAMINATED PACKAGING MATERIAL FOR A CONTAINER

(75) Inventors: Albert Menalda, Tiel (NL); Cornelis Johannes Maria Van Der Stappen, Nijmegen (NL)

(73) Assignee: Alternapak Holding B.V., Nijmegen (NL)

( * ) Notice: Subject to any disclaimer, the term of this patent is extended or adjusted under 35 U.S.C. 154(b) by 705 days.

(21) Appl. No.: 13/382,595

(22) PCT Filed: Jul. 9, 2010

(86) PCT No.: PCT/EP2010/059877
§ 371 (c)(1),
(2), (4) Date: Mar. 9, 2012

(87) PCT Pub. No.: WO2011/004001
PCT Pub. Date: Jan. 13, 2011

(65) Prior Publication Data
US 2012/0156478 A1    Jun. 21, 2012

(30) Foreign Application Priority Data

Jul. 9, 2009    (EP) .................................... 09165084

(51) Int. Cl.
| B32B 3/00 | (2006.01) |
| B32B 27/10 | (2006.01) |
| B32B 27/32 | (2006.01) |
| B32B 5/14 | (2006.01) |
| B32B 7/12 | (2006.01) |
| B32B 15/08 | (2006.01) |
| B32B 15/12 | (2006.01) |
| B32B 15/20 | (2006.01) |
| B32B 27/08 | (2006.01) |
| B32B 27/16 | (2006.01) |
| B32B 27/18 | (2006.01) |
| B32B 27/20 | (2006.01) |
| B32B 27/30 | (2006.01) |
| B32B 27/34 | (2006.01) |
| B32B 27/36 | (2006.01) |

(52) U.S. Cl.
CPC .............. B32B 27/10 (2013.01); B32B 5/147 (2013.01); B32B 7/12 (2013.01); B32B 15/08 (2013.01); B32B 15/12 (2013.01); B32B 15/20 (2013.01); B32B 27/08 (2013.01); B32B 27/16 (2013.01); B32B 27/18 (2013.01); B32B 27/20 (2013.01); B32B 27/304 (2013.01); B32B 27/306 (2013.01); B32B 27/32 (2013.01); B32B 27/327 (2013.01); B32B 27/34 (2013.01); B32B 27/36 (2013.01); B32B 2270/00 (2013.01); B32B 2307/30 (2013.01); B32B 2307/31 (2013.01); B32B 2307/50 (2013.01); B32B 2307/51 (2013.01); B32B 2307/558 (2013.01); B32B 2307/714 (2013.01); B32B 2307/72 (2013.01); B32B 2307/7242 (2013.01); B32B 2307/7265 (2013.01); B32B 2307/75 (2013.01); B32B 2439/00 (2013.01); B32B 2439/70 (2013.01); *Y10T 428/265* (2015.01); *Y10T 428/3175* (2015.04); *Y10T 428/31909* (2015.04)

(58) Field of Classification Search
CPC .......... B32B 27/10; B32B 5/147; B32B 15/08; B32B 15/12; B32B 15/20; B32B 27/08; B32B 27/16; B32B 27/18; B32B 27/20; B32B 27/304; B32B 27/34; B32B 27/36; Y10T 428/265; Y10T 428/31909; Y10T 428/3175
See application file for complete search history.

(56) References Cited

U.S. PATENT DOCUMENTS

| 4,590,126 A | * | 5/1986 | Andersson .................... 428/349 |
| 6,509,106 B1 | * | 1/2003 | Edwards et al. .............. 428/523 |
| 6,858,106 B1 | | 2/2005 | Ikenoya |

(Continued)

FOREIGN PATENT DOCUMENTS

| CN | 85101837 | 1/1987 |
| CN | 85101837 A | 1/1987 |

(Continued)

OTHER PUBLICATIONS

State Intellectual Property Office of the People's Republic of China, Notification of the First Office Action for corresponding foreign application 201080029490.8, Date of Notification Nov. 5, 2013.
European Search Report and the Written Opinion of the European Patent Office Patent Office in counterpart foreign application No. PCT/EP2010/059877 filed Jul. 9, 2010.
Database WPI Week 199732, Thomson Scientific, London, GB; AN 1997-346826 XP002594831 & JP 9142455 A (Toppan Printing Co. Ltd.) Jun. 3, 1997 (Jun. 3, 1997) *abstract.
Ji-Zhao Liang, "The elastic behaviour during capillary extrusion of LDPE/LLDPE blend melts", Polymer Testing, 21 (2002), pp. 69-74.
International Standard ISO 11443: 1995 (E), "Plastics—Determination of the fluidity of plastics using capillary and slit-die rheometers."
Chinese Office Action issued Dec. 17, 2015 from correspondeing Chinese Patent Application No. 201080029490.8.

*Primary Examiner* — Samir Shah
(74) *Attorney, Agent, or Firm* — Westman, Champlin & Koehler, P.A.

(57) ABSTRACT

A laminated packaging material for containers for liquids includes a thermoplastic material outermost layer, a paper substrate layer and a thermoplastic material innermost layer, the thermoplastic material innermost layer comprising a blend of a linear low density polyethylene (LLDPE) and a low density polyethylene (LDPE), the blend having a low swelling ratio in a range from 0.9 to 1.2. The blend further may have a melt flow index in a range from 5 to 20 dg/min. The LLDPE component of the blend is made by polymerization in the presence of a single site catalyst and has an average density a range from 0.86 to 0.92 g/mL and a peak melting point a range from 55 to 105° C. The thermoplastic material innermost layer prepared using such blends advantageously has a low layer thickness a range from 8 to 25 μm.

7 Claims, No Drawings

(56) References Cited

U.S. PATENT DOCUMENTS

| | | | |
|---|---|---|---|
| 6,974,612 B1 | 12/2005 | Frisk | |
| 2002/0142178 A1* | 10/2002 | Yamashita et al. | 428/461 |
| 2005/0037191 A1* | 2/2005 | Ikenoya | 428/323 |
| 2010/0183881 A1* | 7/2010 | Yasui et al. | 428/421 |

FOREIGN PATENT DOCUMENTS

| | | |
|---|---|---|
| CN | 1589201 A | 3/2005 |
| EP | 1164085 | 12/2001 |
| EP | 1164085 A | 12/2001 |
| EP | 1285744 | 2/2003 |
| EP | 1285744 A | 2/2003 |
| EP | 1666363 | 6/2006 |
| EP | 1666363 A | 6/2006 |
| JP | H09142455 A | 6/1997 |
| JP | 3077573 B2 | 8/2000 |
| WO | WO 9826994 | 6/1998 |

* cited by examiner

LAMINATED PACKAGING MATERIAL FOR A CONTAINER

CROSS-REFERENCE TO RELATED APPLICATION

This Application is a Section 371 National Stage Application of International Application No. PCT/EP2010/059877, filed Jul. 9, 2010 and published as WO 2011/004001 A1 on Jan. 13, 2011, in English.

BACKGROUND

The discussion below is merely provided for general background information and is not intended to be used as an aid in determining the scope of the claimed subject matter.

An aspect of the present invention relates to a laminated packaging material for a container comprising a substrate layer of paper and at least one other layer which contains at least a linear low density polyethylene.

Disposable packages for packaging products such as liquid foods are well known. A large group of these single use disposable packages is produced from a laminated packaging material comprising a core or substrate layer of paper or paperboard and outer coatings of thermoplastic material on both sides of the core layer. A commonly used thermoplastic material comprises low density polyethylene (LDPE).

The usual liquid-tight layers of LDPE material suffer from a number of drawbacks. A conventional LDPE-layer must be relatively thick in order to give a longitudinal sealing joint which is of sufficient mechanical strength and liquid tightness. In addition, a packaging laminate with outer layers of LDPE requires a relatively high thermosealing temperature, which consumes a relatively high amount of energy in the process.

Ethylene olefin copolymers produced by polymerisation in the presence of a catalyst with a single active site ("single site catalyst"), such as a metallocene catalyst, are known for their superior mechanical strength properties such as high toughness, elasticity and puncture resistance, even in a thin film. The ethylene copolymers produced in this manner, in case of a metallocene catalyst known as metallocene linear low density polyethylene (metallocene LLDPE or mLLDPE) or metallocene polyethylene (mPE), are known for good heat sealing properties at a considerably lower temperature than conventional LDPE. In addition, with metallocene LLPDE a narrow molecular weight distribution is obtained. However, metallocene LLDPE in pure form also suffers from a series of drawbacks, since in pure form poorer processing properties than LDPE in extrusion lamination are obtained.

SUMMARY

This Summary and the Abstract herein are provided to introduce a selection of concepts in a simplified form that are further described below in the Detailed Description. This Summary and the Abstract are not intended to identify key features or essential features of the claimed subject matter, nor are they intended to be used as an aid in determining the scope of the claimed subject matter. The claimed subject matter is not limited to implementations that solve any or all disadvantages noted in the Background.

An aspect of the present invention pertains to a laminated packaging material for containers for liquid foods is provided that comprises a thermoplastic material outermost layer, a paper substrate layer and a thermoplastic material innermost layer, the thermoplastic material innermost layer comprising a blend of a linear low density polyethylene (LLDPE) and a low density polyethylene (LDPE), also referred to as an LDPE/LLDPE blend, the blend having a low swelling ratio, i.e. a swelling ratio in a range from 0.9 to 1.2.

DETAILED DESCRIPTION

Throughout this disclosure, the terms "linear low density polyethylene", "LLDPE", "metallocene LLDPE" or "mLLDPE" are used to define an LLDPE that is prepared by polymerisation in the presence of a single site catalyst. Examples of such a single site catalyst are a metallocene catalyst and a catalyst sometimes referred to as a "post-metallocene" catalyst.

The swelling ratio SR is defined by the expression $SR=d_s/d_o$, wherein $d_s$ is the transversal diameter of the melted polymer extruded from an orifice and $d_o$ is the diameter of the orifice. The diameters are measured under the same conditions as those of the ISO 1133 method for measurement of the melt flow index.

Preferably, the swelling ratio of the blend is in a range from 0.9 to 1.1.

It was now found that in extrusion lamination a low neck-in effect of the extruded material is obtained when using a LDPE/LLDPE blend having a low swelling ratio in a range from 0.9 to 1.2.

Die swell relates to the phenomenon that the diameter of the extrudate immediately increases after the extrudate leaves the orifice of an extrusion die. In film extrusion, this produces an increase in thickness and a decrease in width of the film layer. The reduction of film width after the material has left the extrusion die is known as the neck-in effect. Neck-in can cause uncoated areas on a substrate and can cause the sides of the extruded film to be too thick, which would result in uneven thickness of the outer layer of the packaging material. Both unwanted phenomena can be avoided by not using the end parts of the extruded laminate. But as this spills part of the material, a less favourable situation is obtained with loss of material and higher costs.

A further advantage of the LDPE/LLDPE blends as specified herein is that a low layer thickness of the thermoplastic material innermost layer can advantageously be obtained, i.e. a thickness in a range from 8 to 25 μm, preferably in a range from 10 to 20 μm, more preferably in a range from 12 to 18 μm, most preferably in a range from 13 to 17 μm. A low layer thickness of the thermoplastic material innermost layer is advantageous because metallocene LLDPE is expensive. Therefore, maximum effort is put in minimising the thickness of metallocene LLDPE-containing layers and minimising spills during the manufacturing of the film layers. A low layer thickness also leads to less raw materials usage and transport, providing an advantage for the environment, such as a lower carbon-footprint.

The thermoplastic material innermost layer as described herein is the layer that faces towards the interior of the container when the packaging material is formed into a container.

In addition to the low swelling ratio, the LDPE/LLDPE blend preferably has a melt flow index in a range from 5 to 20 dg/min (=g/10 min), preferably in a range from 6 to 15 dg/min, more preferably in a range from 7 to 12 dg/min. The melt flow index is defined as the mass of polymer in grams flowing in 10 minutes through a capillary of specific diameter and length by a pressure applied via a prescribed gravimetric weight at a prescribed temperature (190° C./2.16 kg). The method is according to ISO 1133.

To obtain an LDPE/LLDPE blend having a low swelling ratio in a range from 0.9 to 1.2, care has to be taken to select an appropriate LLDPE.

The LLDPE to be used has a low degree of long chain branching (LCB). As is discovered in recent years a low but not too low amount of LCB in single-site catalyst LLDPE is favourable for decreased neck-in during extrusion coating. That is why producers of LLDPE in recent years have sought ways to vary this sometimes called "sparse LCB" in their materials.

Examples of developments are e.g. DOW Chemical's SLEP (substantially linear polyethylenes), Borealis' dual reactor process Borstar bimodal molecular weight polyethylenes and mixed conventional/single-site catalyst system ELITE™ series of Dow. But also more standard types of mLLDPE (as e.g. EXACT™ plasto-mers (ex DEXPLASTOMERS) can show the desired characteristics.

Suitable LLDPEs for use as described herein may thus be found within the range of abovementioned resins.

The LLDPE further has a narrow molecular weight distribution (MWD), for instance has an $M_w/M_n$ ratio ≤2.8, preferably ≤2.6 ($M_w$=Weight average molar mass, $M_n$=Number average molar mass).

The LLDPE to be used also has a low swelling ratio in a range from 0.9 to 1.2, preferably in a range from 0.9 to 1.1.

The LLDPE to be used further may have an average density and peak melting point as specified below.

The average density of the LLDPE may be in a range from 0.86 to 0.92 g/mL, preferably in a range from 0.88 to 0.91 g/mL. The average density is measured according to ISO 1183.

The peak melting point of the LLDPE may be in a range from 55 to 105° C., preferably in a range from 70 to 100° C., more preferably in a range from 90 to 100° C. The peak melting point is measured using differential scanning calorimetry (DSC), according to ASTM D3418.

In one embodiment, a blend of at least two types of LLDPE's is used, one having an average density in the lower part of the density range, i.e. in a range from 0.86 to 0.89 g/mL, and another having an average density in the higher part of the density range, i.e. in a range from 0.89 to 0.92 g/mL. It is possible to blend the at least two types to obtain more desirable properties.

The LLDPE typically is obtained by copolymerisation of ethylene and an alpha-olefin, preferably an alpha-olefin having 4-8 carbon atoms such as butene-1, hexene-1,4-methyl pentene-1 and octene-1, preferably using a metallocene catalyst. The alpha-olefins may be used solely or as a mixture. A preferred mixture of ethylene and alpha-olefin to be co-polymerised contains 1-20 wt % alpha-olefin.

The type of LDPE that is used in the blend may be a conventional LDPE suitable for extrusion coating. The swelling ratio and the level of long chain branching of the LDPE are less critical than those of the LLDPE. An LDPE having a swelling ration of 1.2 to 1.4 may conveniently be used. Suitable LDPEs for instance may be obtained from INEOS.

The ratio in which the LLDPE and the LDPE are included in the blend is mainly determined by the characteristics of the LLDPE that is used. Important is that the components are blended to obtain a blend having the characteristics as disclosed herein, in particular a low swelling ratio. Typically, the LLDPE content of the blend is in a range from 30% to 80% (w/w) based on the total weight of LLDPE plus LDPE, preferably in a range from 40% to 75% (w/w), more preferably in a range from 50% to 70% (w/w).

Polymer components other than LLDPE and LDPE may be included in the blend to provide the thermoplastic material innermost layer, as long as the above-mentioned properties of the blend are maintained. Examples of additional polymers are a thermoplastic resin, such as a polyolefin resin (e.g. polyethylene, polypropylene, an ethylene copolymer) and and/or a polyester resin.

In addition, various additives may be included in the thermoplastic material innermost layer, depending on the intended use, although it is preferred to use an additive-free layer. Examples of suitable additives are an antioxidant, an ultraviolet absorber, an antistatic agent, a lubricant, an anti-blocking agent, a flame proofing agent, an inorganic and/or an organic filler, a coating material, and/or a pigment.

The laminated packaging material comprises the layers as described herein, i.e. a thermoplastic material innermost layer, a paper substrate layer and a thermoplastic material outermost layer. In addition, additional layers, such as a barrier layer and an adhesive thermoplastic material layer may be included. A typical laminated packaging material contains a thermoplastic material innermost layer, an adhesive layer, a barrier layer, an adhesive layer, a paper substrate layer and a thermoplastic material outermost layer.

The paper substrate layer may be made from kraft pulp providing paper having a good strength and low absorptivity. Examples are bleached paper (FBL), non-bleached paper (UBL), duplex paper (DUPLEX) of FBL and UBL, clay coating paper, multi-layer duplex-paper (MB), etc.

The thermoplastic material outermost layer may comprise a polyolefin resin, such as polyethylene, including medium density polyethylene and/or low density polyethylene, polypropylene, and ethylene copolymers, and may have a coextruded layer containing an LLDPE that is excellent in its resistance to e.g. oil, acid and infiltration of substances, etc.).

In one embodiment, the thermoplastic material outermost layer and/or any of the other polymer layers in the laminate contain(s) at least a LDPE/LLDPE blend as described herein for the innermost layer.

The packaging material for paper containers also may contain a printing ink layer provided on the outside surface of the packaging material. The ink may be a water or oil based ink for flexographic printing, gravure, offset printing, etc.

A barrier layer is to be included to provide the laminate with barrier properties against light or gases. Typically, a barrier layer may comprise at least one of aluminium foil, a metal/inorganic oxide thin film, an ethylene vinyl alcohol copolymer layer (EVOH layer), a nylon layer, a polyvinylidene chloride film.

An adhesive thermoplastic material layer may be included to improve adhesion of two different layers. It may contain an LLDPE having a narrow molecular weight distribution, an ethylene vinyl acetate copolymer (EVA) and a ionomer. The thickness of the adhesive layer(s) suitably may be about 3-25 μm.

In addition to the above-mentioned laminated packaging material, a strip tape may be used for covering a discontinuous section of the innermost layer between two edges of the packaging material. In this way, a liquid tight seal can be provided in the container that is formed from the packaging material. The strip tape may advantageously be a laminate comprising a layer containing the LDPE/LLDPE blend as described herein laminated on at least one side of an intermediate layer. The intermediate layer may be made of any thermoplastic material that provides sufficient stiffness to the layer. For example, the intermediate layer may be a high-density polyethylene (HDPE), polyester (for instance (amorphous) PET) or polyamide layer. Preferably, the strip tape contains a layer containing the LDPE/LLDPE blend on both sides of the intermediate layer.

The packaging material for paper containers may be manufactured using commonly known lamination technology.

For instance, a common lamination method for packaging material for paper containers includes wet lamination, dry lamination, non-solvent type dry lamination, extrusion lamination, coextrusion lamination, film blowing, etc. If necessary, a pretreatment such as a corona treatment, ozonization, etc. may be carried out to the film. In addition, anchor-coat agents, such as isocyanate (urethane), polyethylene imine, poly butadiene, and organic titanium, lamination adhesives, such as polyurethane, poly acrylate, polyester, epoxy, polyvinyl acetate, and cellulose may be used.

As explained above, if the packaging laminate is manufactured using an extrusion lamination process, more merits of the invention can be obtained.

Conveniently, a filled container is made from the laminated packaging material by forming the laminated packaging material into a tube shape, applying a longitudinal seal along the edges of the packaging material, filling the formed packaging material with the product, providing a transversal seal onto the filled packaging material, and forming the filled packaging material into a desired shape, such as a brick shape. Finally, in order to protect the packaging material edge in the longitudinal-seal portion, the level difference section of the innermost layer may be covered by a liquid-tight strip tape. Moreover, a hole provided with a spout and/or pull tab may be provided on top of the container.

The use of the packaging material as described herein allows for a more efficient lamination process and a quick heat sealing, and results in toughly and strongly sealed containers. It provides lower material usage and less material spills in production, which has a cost advantage and an advantage for the environment, such as a lower carbon-footprint.

Aspects of the present invention are elucidated by the following examples, without being limited thereto or thereby.

EXAMPLES

Example 1

Properties of LDPE/mLLDPE Blends

A metallocene linear low density polyethylene (mLLDPE) having a narrow molecular weight distribution was used. The mLLDPE has an average density of 0.90 g/ml, a peak melting point of 95° C., a melt flow index of 10 dg/min and a swelling ratio of 1.0. The low density polyethylene (LDPE) used has an average density of 0.92 g/ml, a peak melting point of 108° C., a melt flow index of 7.3 dg/min and a swelling ratio of 1.35.

The LDPE and the mLLDPE were blended in a ratio LDPE/mLLDPE of 50/50 and 30/70. The 50/50 blend had an average density of 0.910, a peak melting point of 106° C., a melt flow index of 7.3 and a swelling ratio of 1.0. The 30/70 blend had an average density of 0.906, a peak melting point of 104° C., a melt flow index of 8.1 and a swelling ratio of 1.1.

The average density was measured according to ISO 1183, the peak melting point by DSC according to ASTM D3418 and the melt flow index according to ISO 1133. The swelling ratio is defined by the expression $SR=d_s/d_o$, wherein $d_s$ is the transversal diameter of the melted polymer extruded from an orifice and $d_o$ is the diameter of the orifice, as measured under the same conditions as the measurement conditions in the ISO 1133 method.

Example 2

Extrusion Lamination of the Blends and Properties of the Obtained Laminates

The mLLDPE and LDPE of example 1 were blended in a ratio LDPE/mLLDPE of 60/40, 40/60 and 30/70. The extruded film obtained with the blends exhibited a lower neck-in as compared to an extruded film obtained with pure LDPE. As compared to pure LDPE, the neck-in of the 60/40, 40/60 and 30/70 blends, respectively, was decreased by approximately 50%, 70% and 80%, respectively. This measurement was done immediately after the extrudate left the extrusion die of the extrusion lamination machine, in a non-running situation. In addition, the extruded film obtained with the blends showed a puncture resistance which increased with the amount of mLLDPE in the blend.

The thermoplastic material innermost layer obtained with these blends was further laminated by extrusion lamination, and a laminated film comprising an aluminium foil/adhesive layer/thermoplastic material innermost layer was prepared. The obtained layer thickness of the innermost layers was 16±1 μm.

Example 3

Preparation of a Strip and Containers

Using a conventional filling machine, a packaging container of a brick shape was manufactured using a packaging material comprising an innermost layer containing the LDPE/mLLDPE blend as specified in Examples 1 and 2 and a strip tape having the laminated constitution sealing-surface layer/PET layer/sealing-surface layer.

The sealing-surface layer of the strip tape was a blended material of the mLLDPE and LDPE described in Examples 1 and 2. The sealing-surface layer was extruded to a PET film, and a laminated strip tape of 6-12 mm width was obtained by slitting.

For the 50/50 LDPE/mLLDPE blend (see Example 1) a strip was obtained using a PET film having a thickness of 23 μm. The thickness of the LDPE/mLLDPE layer was 27 μm. For the 40/60 blend (see Example 2) a strip was obtained using a PET film having a thickness of 15 μm. The thickness of the LDPE/mLLDPE layer was 32 μm.

Evaluation of the seal temperature range of the longitudinal seal of the obtained packaging container was performed.

It was shown that the blends exhibit superior performance as compared to a strip containing LDPE layers. For example, the blends provide for sealing at a lower temperature than pure LDPE.

The invention claimed is:

1. A laminated packaging material for containers for use with liquids, said packaging material comprising a thermoplastic material outermost layer, a paper substrate layer and a thermoplastic material innermost layer, the thermoplastic material innermost layer comprising a blend of a linear low density polyethylene (LLDPE) and a low density polyethylene (LDPE), wherein the LLDPE is prepared by polymerization in the presence of a metallocene catalyst, the blend having a swelling ratio in a range from 0.9 to 1.2 and an LLPDE content in a range from 30% to 80% (w/w) based on a total weight of LLDPE plus LDPE, wherein the LLPDE has a swelling ratio in a range from 0.9 to 1.1 and a narrow molecular weight distribution having a ratio of a weight average molar mass to a number average molar mass of less than or equal to 2.8, wherein the LLDPE comprises at least two types, one having an average density in a range from 0.86 to 0.89 g/mL, or below, and another having an average density in a range from above 0.89 to 0.92 g/mL and wherein the thermoplastic material outermost layer also comprises a blend of a linear low density polyethylene (LLDPE) and a low density polyethylene (LDPE), the blend having a swelling ratio in a range from 0.9 to 0.1.

2. The packaging material of claim 1, wherein the melt flow index of the blend is in a range from 5 to 20 dg/min.

3. The packaging material of claim 1, wherein the thermoplastic material innermost layer has a layer thickness in a range from 8 to 25 µm.

4. The packaging material of claim 1, wherein the LLDPE content of the blend of the outermost layer is in a range from 30% to 80% (w/w) based on the total weight of LLDPE plus LDPE.

5. A method of manufacturing a packaging material of comprising:
   polymerizing a linear low density polyethylene (LLDPE) in the presence of a metallocene catalyst;
   providing a paper substrate material, providing a thermoplastic material, the thermoplastic material comprising a blend of the linear low density polyethylene (LLDPE) and a low density polyethylene (LDPE), the blend having a swelling ratio in a range from 0.9 to 11 and an LLPDE content in a range from 30% to 80% (w/w) based on a total weight of LLDPE plus LDPE, wherein the LLPDE has swelling ratio in a range from 0.9 to 1.1 and a narrow molecular weight distribution having a ratio of a weight average molar mass to a number average molar mass of less than or equal to 2.8, wherein the LLDPE comprises at least two types, one having an average density in a range from 0.86 to 0.89 g/mL, or below, and another having an average density in a range from above 0.89 to 0.92 g/mL; and
   extruding the thermoplastic material onto the paper substrate material to form an innermost layer on a side of the paper substrate material using extrusion lamination; providing thermoplastic material outermost layer, wherein the thermoplastic material outermost layer also comprises a blend of a linear low density polyethylene (LLDPE) and a low density polyethylene (LDPE), the blend having a swelling ratio in a range from 0.9 to 0.1.

6. The method of manufacturing the packaging material of claim 5 and further comprising: forming the packaging material into a tube shape, applying a longitudinal seal along the edges of the packaging material, filling the formed packaging material with the product, providing a transversal seal onto the filled packaging material, and forming the filled packaging material into a desired shape.

7. The method of claim 6, wherein applying the longitudinal seal comprises utilizing a discontinuous section of the innermost thermoplastic layer between two edges of the packaging material, and covering the discontinuous section with a strip tape comprising a laminate comprising an intermediate layer and a layer containing a blend of a linear low density polyethylene (LLDPE) and a low density polyethylene (LDPE), the blend having a swelling ratio in a range from 0.9 to 1.2, wherein the layer is laminated on at least one side of the intermediate layer.

* * * * *